they mix in the absence of air. The mixed resin and catalyst pass through an outlet nozzle at the opposite end of the mixing chamber and exit as a substantially non-atomized liquid jet. An air operated fiberglass chopper connected with the body directs an airborne jet of chopped fiberglass strands into the jet of mixed resin and catalyst externally of the outlet nozzle when it is supplied with air under pressure. An air valve, connected with an external supply of air under pressure, is operated by the trigger during motion relatively toward the body to supply air to the fiberglass chopper so that mixed resin and catalyst together with the entrained chopped fiberglass are applied in a liquid stream.

United States Patent [19]
Marshall, III

[11] 3,801,009
[45] Apr. 2, 1974

[54] APPLICATOR GUN FOR APPLYING HARDENABLE PLASTIC COMPOSITIONS CONTAINING FIBERS

[76] Inventor: Joseph Marshall, III, 6153 Academy Ave., Riverside, Calif. 92506

[22] Filed: May 29, 1973

[21] Appl. No.: 364,683

[52] U.S. Cl. .................... 239/9, 239/414, 239/433
[51] Int. Cl. .............................................. B05b 7/14
[58] Field of Search .......... 239/8, 420, 433, 9, 414, 239/336, 429, 570, 571

[56] References Cited
UNITED STATES PATENTS
| | | | |
|---|---|---|---|
| 3,033,472 | 5/1962 | Shelton | 239/433 X |
| 3,111,272 | 11/1963 | Underdown et al. | 239/420 |
| 3,606,154 | 9/1971 | Tufts | 239/420 X |

Primary Examiner—M. Henson Wood, Jr.
Assistant Examiner—Michael Y. Mar
Attorney, Agent, or Firm—Fulwider Patton Rieber Lee & Utecht

[57] ABSTRACT
An applicator gun which is used for spray application of hardenable plastic compositions, comprising a resin and a catalyst, and reinforcing fibers. The gun includes a body having an enclosed mixing chamber. Separate resin and catalyst valves connected with the body selectively connect the mixing chamber at one of its ends to external sources of resin and catalyst under pressure. Motion of a finger operated trigger towards the body, with which it is pivotally connected, operates the resin and catalyst valves to deliver resin and catalyst into the mixing chamber where 16 Claims, 8 Drawing Figures

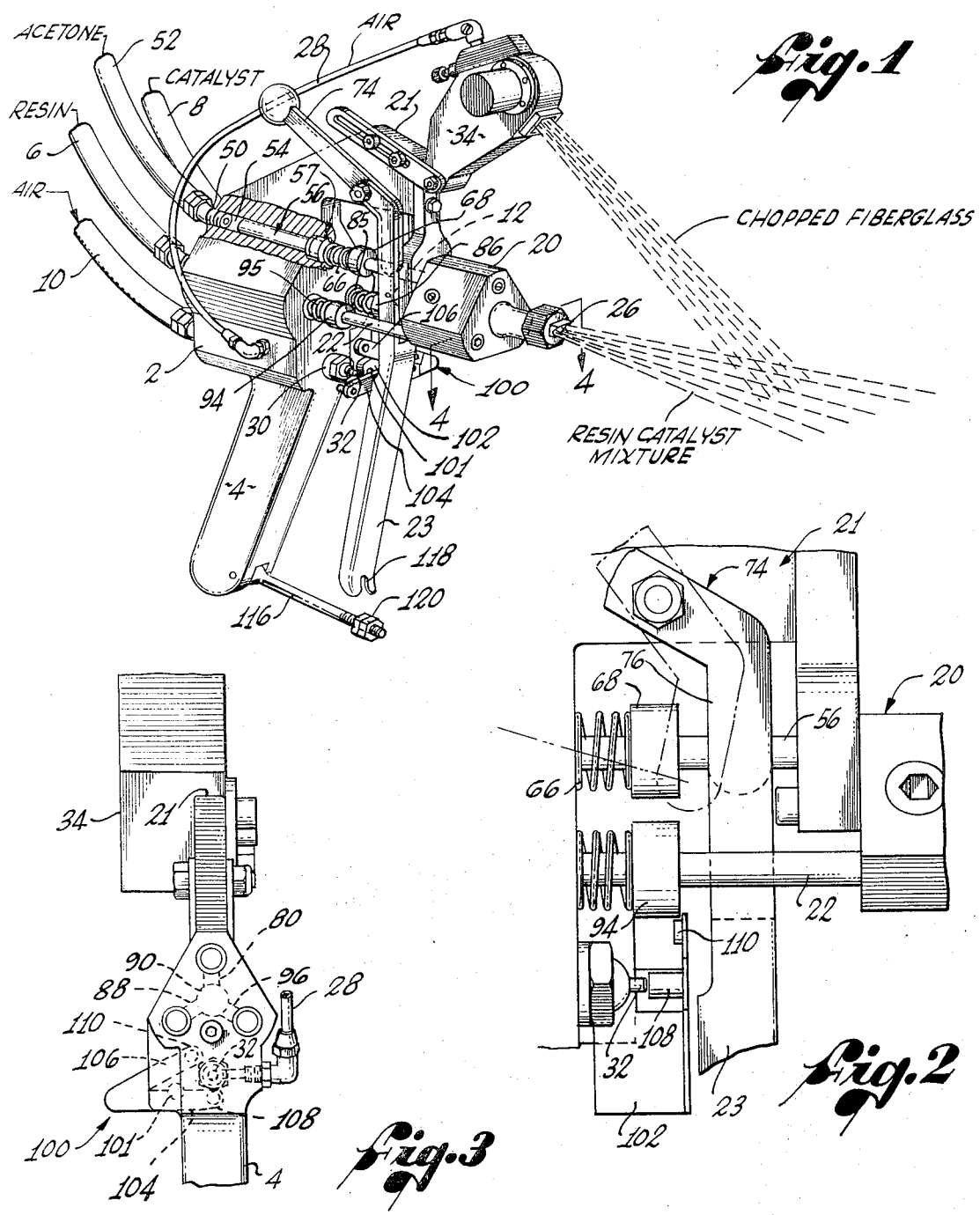

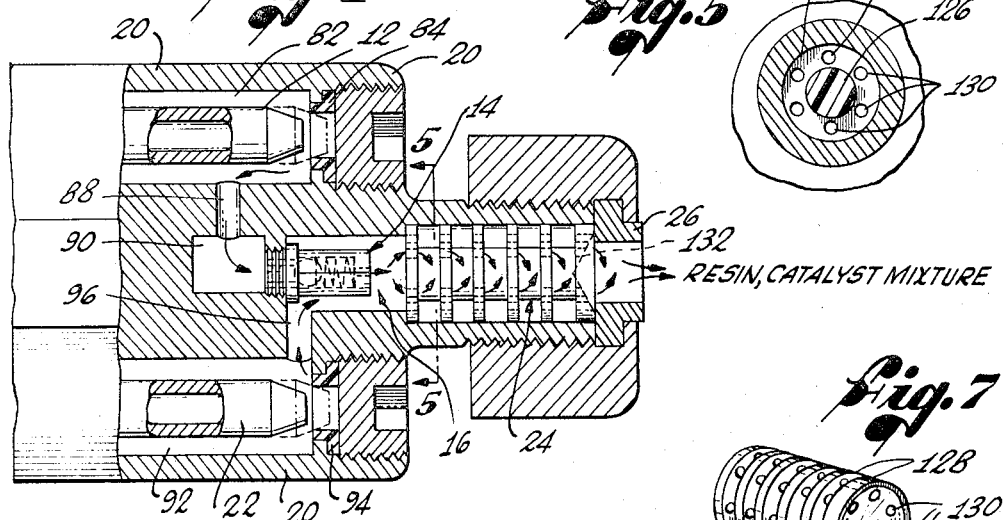
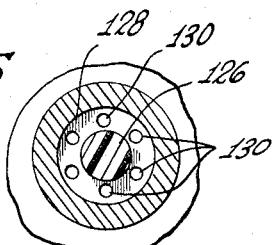
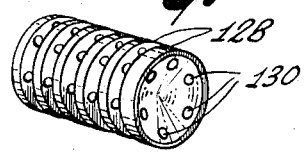
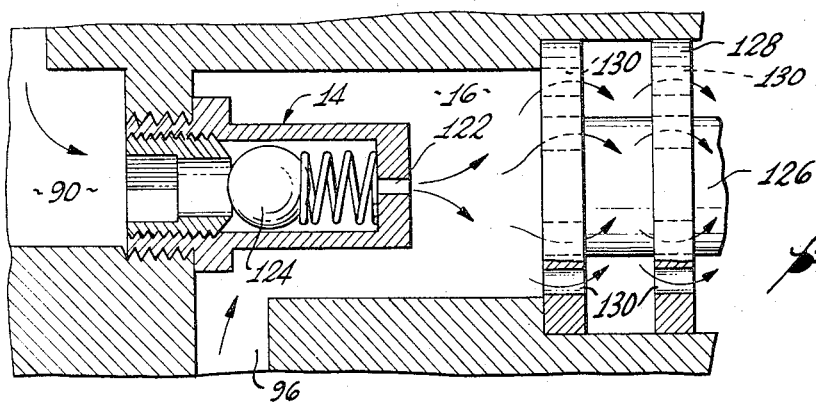
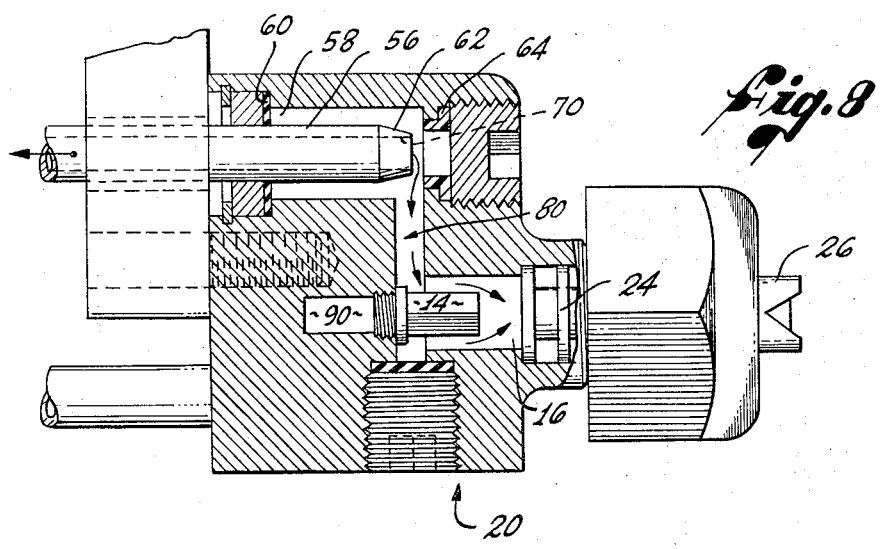

APPLICATOR GUN FOR APPLYING HARDENABLE PLASTIC COMPOSITIONS CONTAINING FIBERS

BACKGROUND OF THE INVENTION

This invention relates to an applicator gun utilized for spray application of hardenable liquid plastic compositions containing reinforcing fiber material such as chopped fiberglass strands.

Many manufacturing operations involve the spray application of hardenable liquid plastic compositions containing chopped fiberglass strands. The liquid plastic composition generally includes a first constituent comprising a resin and a second constituent comprising a hardening agent, which, after mixing with the first constituent, provides a resulting composition which will harden to a solid state. For purposes of nomenclature, the two constituents will hereinafter be referred to as "resin" and "catalyst." Details of suitable resins and hardening agents are described in U.S. Pat. No. 2,890,836 to Gusmer et al., relevant portions of the disclosure of which are incorporated herein by reference. Chopped fiberglass strands are often included in the resin-catalyst mix during its application to improve the mechanical properties of the mix after it has hardened.

In the spray application of such resin-catalyst-chopped fiberglass mixtures, it has been common to utilize spray guns which effect mixing of the resin and catalyst constituents by the use of propellant (e.g., compressed air), with the resultant mixture being ejected from a spray nozzle as an atomized spray. The chopped fiberglass strands, supplied from a compressed air operated fiberglass chopper, are directed into the atomized spray to mingle with it prior to impact with the surface being sprayed. Such a prior system is, for example, shown in U.S. Pat. No. 3,330,484 to Johnson et al.

Although generally satisfactory and in extensive use, such prior devices relying on the creation of an atomized spray may result in a 5-12 percent resin loss during application. Such a loss can occur because the atomized spray contains some particles which are so finely divided that air resistance causes them to lose their forward velocity prior to reaching the surface to be sprayed so that they float away without ever reaching it. In addition, such finely divided particles may tend to harden before they reach the workpiece so that their ability to form a coating is lost. To avoid the disadvantages of an atomized spray, therefore, it is an objective of the present invention to provide a system in which the mixing of the resin and catalyst occurs in the absence of air and in which the jet of mixed resin and catalyst impinging on the workpiece is a liquid jet which is substantially not atomized.

With such a system it is believed that it would be possible to apply virtually all the resin fed through the gun to the workpiece which, in view of the very high cost of resin per pound, could effect major financial savings on a yearly basis for a commercial sprayer in average utilization.

Although it has been known to provide a spray gun in which the resin and catalyst components are mixed in the substantial absence of air, as shown in the aforementioned Gusmer et al., U.S. Pat. No. 2,890,836, such prior device made no provision for the inclusion of chopped fiberglass in the resulting resin-catalyst mixture. Furthermore, the valving structure associated with the internal mixing system of the prior device could not readily have been adapted to control a third component, namely, the compressed air necessary to provide an airborne jet of chopped fiberglass strands impinging on the resin-catalyst stream.

SUMMARY OF THE INVENTION

An applicator gun according to the present invention, is intended to enable application of resin, virtually without loss, to a surface being sprayed by eliminating the loss of resin which is inherent if atomized particles are produced in the spraying process. In particular, this result is achieved by providing an applicator gun in which the resin and catalyst are brought together in concentric outer and inner streams, respectively, into a mixing chamber where they are mixed in the absence of air. The mixed liquids are then sprayed as a nonatomized liquid jet into which an airborne stream of the chopped fiberglass strands is injected externally of the gun.

Moreover, the applicator gun utilizes valving structure for coordinating the separate flows of resin, catalyst and air under the operation of a single trigger utilizing a valving structure which is simple and reliable and can be economically manufactured.

In more detail, an applicator gun, according to the invention, is intended for use in the application of resin-catalyst-fiberglass mixtures utilizing separate external sources of air, resin and catalyst under pressure and a supply of fiberglass. The gun includes a body that is provided with an internal mixing chamber. Resin and catalyst valves are connected with the body for selectively connecting one end of the mixing chamber with the external sources of resin and catalyst under pressure. A trigger connected with the body may be squeezed to operate the resin and catalyst valves to deliver resin and catalyst, respectively, into the mixing chamber as concentric outer and inner streams where they mix in the absence of air. An outlet nozzle at the opposite end of the mixing chamber directs the mixed resin and catalyst outwardly as a substantially non-atomized liquid jet which, although it may be broken up in some regions into large droplets, does not include microparticles of the small size found in an atomized spray. A fiberglass chopper connected with the body directs an airborne jet of chopped fiberglass strands into the liquid jet of mixed resin and catalyst issuing from the outlet nozzle, when the fiberglass chopper is supplied with air under pressure. An air valve connected with the body selectively connects the fiberglass chopper with the external supply of air under pressure and is operated by the trigger during motion towards the handle to supply air under pressure to the fiberglass chopper to actuate it.

As a result of the avoidance of atomized particles, resin consumption is improved by an amount which has substantial commercial significance over an extended period of use of the applicator gun using normal commercial quantities. Furthermore, this desirable result is achieved by the use of separate valving for the air, catalyst and resin streams which is all coordinated by the operation of a single trigger.

In addition, to provide the operator with greater flexibility, a variable selector is provided so that different combinations of the materials can be sprayed when the trigger is depressed. With one setting of the selector, corresponding to the normal spraying mode, depression of the trigger causes resin, air and chopped fiberglass to be applied concurrently. With another setting of the selector, depression of the trigger causes air only to be directed through the gun so that chopped fiberglass alone is directed against the workpiece. In a further setting of the selector, resin and catalyst without fiberglass may be applied when the trigger is depressed. Thus the operator can, by simple change of the selector position, spray different compositions as required by the exigencies of the situation.

The foregoing, and other advantages, are described in the detailed description hereinafter.

BRIEF DESCRIPTION OF THE DRAWINGS

An applicator gun for applying hardenable plastic compositions, containing fiberglass, is illustrated in the accompanying drawings in which:

FIG. 1 is a perspective view, partially in cross-section, of an applicator gun constructed in accordance with the preferred embodiment of the invention;

FIG. 2 is a side view on an enlarged scale of a portion of the applicator gun shown in FIG. 1, illustrating the operation of a trigger forming a part of the applicator gun;

FIG. 3 is a fragmentary rear end view of the applicator gun shown in FIG. 1;

FIG. 4 is an enlarged cross-sectional top view of a forward end body of the applicator gun shown in FIG. 1, taken along the lines 4—4 therein, with a resin valve and a catalyst valve, forming a part of the invention, both shown in a closed, or seated, condition;

FIG. 5 is a cross-sectional view of a portion of the applicator gun shown in FIG. 4, taken along the lines 5—5 therein;

FIG. 6 is a cross-sectional side view on an enlarged scale of an internal catalyst nozzle and adjacent portions of the applicator gun shown in FIG. 4;

FIG. 7 is a perspective view of an agitator forming a part of the applicator gun shown in FIG. 4; and FIG. 8 is a cross-sectional view of the portion of the applicator gun shown in FIG. 4 with a solvent valve, forming a part of the invention, shown in an open, or unseated condition.

DETAILED DESCRIPTION

An applicator gun according to the invention includes a body 2 (FIG. 1) having a handle 4 which may be gripped by hand. The rear end of the body 2 is connected by flexible pressure hoses 6, 8 and 10 to external sources of resin, catalyst and compressed air, respectively. The resin and catalyst are supplied under pressure without entrained air and may be delivered, for example, from high pressure positive pumps. The catalyst is fed via a sliding tubular, catalyst valve 12 (FIG. 4) to a nozzle unit 14 projecting forwardly into a mixing chamber 16 extending in axial and radial directions within a forward portion 20 of the body 2. The forward portion 20 is spaced forwardly from the remainder of the body 2 and connected thereto by arch-like structure 21. The resin is also fed into the mixing chamber 16 via another sliding tubular resin valve 22. The operation of the valves 12 and 22 is controlled by a trigger 23 as will be described.

The resin and catalyst, which thus entered the chamber as concentric outer and inner streams, then pass through a series of perforated baffles in an agitator 24 in which they become thoroughly mixed, and exit as a liquid jet of mixed resin and catalyst through an outlet nozzle 26. The mixing that occurs in the mixing chamber 16 occurs in the absence of air. In addition, the nozzle 26 is shaped to issue the jet as a substantially liquid jet without atomization. By this it will be understood that although the jet may to some extent break up into droplets, substantially none of the droplets are of such small size as to resemble the microparticles produced in an atomizing spray. As a result, the liquid droplets are sufficiently large not to be slowed down by air resistance to such an extent as to prevent their reaching the workpiece, so that loss of resin through blowing or drifting of microparticles is avoided. In addition the size of the droplets is too great to permit the droplets to harden prior to reaching the workpiece. As a result loss of resin during application is effectively eliminated thereby providing significient savings in resin use.

The air admitted through the air hose 10 is directed through internal passages in the body 2 to an air conduit 28 (FIG. 1) under the control of an air valve 30, of conventional construction, having a button-like, forwardly biased, air valve actuator 32. The air conduit 28 delivers the compressed air to a fiberglass chopper 34 which is fed with an external supply of fiberglass strands (not shown). The fiberglass chopper is of conventional construction and may, for example, be similar to the fiberglass chopper disclosed in the previously referred to U.S. Pat. No. 3,330,484. When supplied with air, the fiberglass chopper 34 chops the fiberglass strands into small particles and directs them as an airborne jet at an acute inclination into the mixed resin-catalyst jet issuing from the outlet nozzle 26. The fiberglass particles become entrained in the jet of resin-catalyst mixture and are carried forwardly by it into contact with the surface being sprayed.

It will be understood that other reinforcing fibrous materials e.g. nylon, asbestos and the like, may be used and the invention is not limited to the use of glass fibers.

After spraying has been completed, it is necessary to flush out any mixed resin and catalyst remaining within the mixing chamber and outlet nozzle in order to prevent it hardening in situ and clogging the gun. For this purpose, the body 2 is provided with a connection 50 (FIG. 1) to a flexible pressure hose 52 connected to an external source of solvent, such as acetone, under pressure. The fitting 50 communicates with an axially extending tubular inlet port 54 in the upper part of the body 2, which slidingly receives a hollow, tubular solvent valve 56 (FIGS. 1 and 8). The inlet port 54 is in continuous communication with the axial passage through the center of the valve 56. Adjacent its rear end, the acetone valve 56 passes through an annular seal 57 which maintains a peripheral seal between the inlet port 54 and the exterior of the acetone valve.

The acetone valve 56 extends through the forward end of the body 2 and into the forward portion 20 of the body where it enters an internal chamber 58. A seal 60 (FIG. 8) extending slidingly around the solvent valve 56 prevents escape of fluid from the internal chamber 58. At its forward end the acetone valve 56 is chamfered to provide a generally frustoconical forward surface 62 which seats against an annular valve seat 64 mounted in the forward end wall of the chamber 68. The valve is normally biased into sealing contact against the valve seat by a valve spring 66 (FIG. 1) extending between the body 2 and a disc-like valve actuator 68 fixedly secured to and extending around the periphery of the valve 56.

To admit solvent to the chamber 58, a lever 74 pivotally mounted on the arch structure 21 is pivoted upwardly so that its downwardly angled lower end 76 (FIG. 2) contacts the valve actuator 68 and moves the solvent valve 56 rearwardly against the action of the spring 66. As the forward end of the valve 56 unseats, solvent enters the chamber 58 under pressure via the passage through the center of the valve. The solvent passes from the chamber 58 through a downward passage 80 (FIG. 8) in the body 2, into the rear end of the mixing chamber 16. The solvent then passes through the mixing chamber and the agitator and out of the outlet nozzle 26 flushing out any mixed resin and catalyst remaining within the applicator gun.

It will be appreciated that during the just described solvent flushing step, the resin and catalyst valves 22 and 12, respectively, are closed.

The structure of the resin and catalyst valves is generally similar to that described for the acetone valve. Thus, the catalyst valve 12 (FIG. 4) sealingly enters another closed internal chamber 82 in the forward portion 20 and has a frustoconical forward surface which seats against an annular valve seat 84 mounted in the front end wall of the chamber. The catalyst valve 12 is biased into closed relation against the valve seat 84 by a spring 85 (FIG. 1) interposed between the body 2 and a disc-like valve actuator 86 secured to and extending around the body of the catalyst valve 12. When the catalyst valve is unseated (as will be described), catalyst enters the internal chamber 82, passes through an intersecting passage 88 (FIG. 4) and enters a chamber 90 from which it passes into the previously mentioned nozzle unit 14.

Likewise, the resin valve 22 sealingly enters another enclosed internal chamber 92 in the forward portion 20 and has a frustoconical forward surface which seats against an annular valve seat 94 mounted in the front end wall of the chamber 92. The resin valve 22 is biased to a closed position against the valve seat 94 by a spring 95 extending between the body 2 and a disc-like resin valve actuator 94 secured to and extending around the body of the resin valve 22. When the resin valve 22 is unseated, resin enters the chamber 92 and flows from there through a connecting passage 96 (FIG. 4) to enter the mixing chamber 16 in a radial direction at a location spaced upstream of the outlet from the nozzle 14. The internal passages, 96 for resin, 88 for catalyst and 80 for acetone, are angularly spaced from each other at 120° as shown in FIG. 3.

Coordinated operation of the resin, catalyst and air valves is effected by the previously mentioned trigger 23 which is pivotally connected to the arch structure 21 and extends downwardly spaced in front of the handle. As the trigger is squeezed rearwardly, it engages the valve actuators 86 and 94 attached to the catalyst valve 12 and the resin valve 22, respectively, both at the same time. Further squeezing motion unseats both valves causing catalyst and resin to be delivered to the mixing chamber 16 in the manner previously described, thus initiating a liquid jet of mixed catalyst and resin from the nozzle 26.

Whether air is delivered to the fiberglass chopper at the same time to actuate it, depends upon the setting of a selector 100 (FIGS. 1–3). The selector 100 includes a sidewardly extending arm 102 connected by pivotal connection 101 to the body 2 adjacent the air valve actuator 32 for vertical swinging motion about a forwardly extending, horizontal pivot axis. The arm 102 includes a stepped shoulder to which are secured two reversely extending leaf springs 104 and 106 at a Vee inclination to each other. At their free extremities the leaf springs 104 and 106 carry axially extending spacing stops 108 and 110, respectively. As the selector 100 is rotated about its pivotal connection 101, either, or neither, of the spacing stops 108 and 110 may be selectively interposed between the air valve actuator button 32 and the trigger 23.

The axial extent of the spacer 110 is such that when it is aligned with the air valve actuator 32, it is contacted by the trigger 23 at the same time that the trigger contacts the actuators 94 and 86 for the resin and catalyst valves 22 and 12, respectively. Further squeezing of the trigger operates all three valves at the same time so that resin and catalyst are fed from the nozzle 26 and chopped fiberglass is sprayed in an air-borne jet from the fiberglass chopper 34. This constitutes the normal mode of operation of the applicator gun.

Alternatively, the selector 100 may be rotated about its pivotal connection 101 until neither of the spacing stops 108 and 110 aligns with the air valve actuator button 32. Then, in its closing motion the trigger 23 will contact the valve actuators for the resin and catalyst valves first so that only resin and catalyst will be ejected from the gun. The relationship is such that with both spacing stops 108 and 110 out of the way, the valve actuators 94 and 86 reach their rearward limit of travel, when their associated springs are fully compressed, before the trigger ever reaches the air valve actuator 32 so that no air is fed to the fiberglass chopper to actuate it.

In a third position, the selector is pivoted about the pivotal connection 101 to bring the spacing stop 108 into alignment with the air valve actuator button 32. The axial length of the spacing stop 108 is such that as the trigger 23 is squeezed, it contacts the spacing stop 108 to depress the air valve actuator 32 before contact is made between the trigger and the actuators for the resin and catalyst valves. The length of the spacing stop 108 is such that the air valve actuator reaches its bottom position before the trigger ever reaches the actuators for the resin and catalyst valves so that they are not operative and as a result only chopped fiberglass strands are sprayed.

It will be appreciated that the selector 100 thereby permits the operator to select whatever combination of the materials — air/fiberglass only, resin and catalyst only, or all of them — that he desires at a particular time while insuring that he will get the particular selected combination whenever the trigger 23 is squeezed against the handle.

The resilience of the leaf springs 104 and 106 permits the described axial movement of the spacing stops 108 and 110 when they are contacted by the trigger. It will also be understood that conventional detent structure (not shown) is provided to retain the arm 102 in each selected one of its three possible positions.

To prevent the operator's fingers from becoming tired while squeezing the trigger during long periods of uninterrupted spraying, a keeper bar 116 is pivotally connected for vertical swinging motion to the lower end of the handle 4 and may be swung upwardly so that its remote end enters a slot 118 in the lower end of the trigger. A nut 120 can then be tightened into position on the correspondingly threaded end of the keeper 116 to bear against the trigger and hold it in the squeezed position against the action of the springs acting on the valve actuators.

The previously mentioned nozzle unit 14 (FIG. 6) is threadedly connected with the forward portion 20 extending forwardly on the axial center line of the mixing chamber 16 from the rear end wall thereof. The nozzle unit 14 includes a forward radial wall having a central axial orifice 122 through which catalyst issues into the mixing chamber 16 in a central axial stream. Catalyst enters the interior of the body 14 through its open rear end via a spring biased, ball-type check valve 124. The function of the check valve is to prevent back flow of solvent or resin into the catalyst flow passages should catalyst flow cease or fail for any reason. The resin, as previously described, enters radially through the channel 96 and then passes forwardly along the mixing chamber to form a concentric, enveloping flow about the stream of catalyst issuing from the orifice 122. The overlapping concentric flows promote mixing in the subsequent passage through the agitator. Because of the greater viscosity of the resin, it is advantageous to have it as the outer flow, thereby having the larger surface area for its volume, so that mixing with the catalyst is promoted. A substantial venturi effect is created within the mixing chamber in the region of the nozzle unit which assists in the introduction of the catalyst into the mixing chamber.

To insure thorough mixing of the catalyst and resin before they reach the outlet nozzle 26, the agitator 24 (FIGS. 5 and 7) is positioned between the inner nozzle unit 14, spaced downstream therefrom, and the outlet nozzle 26. The agitator includes a solid, axially extending, central stem 126 on which are supported a plurality of axially spaced, perforated disc-like baffles 128 extending radially across the entire extent of the mixing chamber. The baffles 128 are provided with a plurality of aligned, small circular holes 130 at regular angular intervals. As the liquids are forced under pressure through each of the holes 130, the flow is swirled at an inward inclination as shown by the arrows in FIG. 6, in accordance with natural laws of turbulence, thereby generating numerous and vigorous eddies and vortices in the liquids. By the time the resin and catalyst streams reach the last baffle, they have been subjected to so much turbulence and agitation that, in practice, it has been found they have been mixed to a homogenous state. The forward radial end face of the agitator is countersunk (FIG. 4) to provide an indentation 132. This indentation assists in guiding the flow from the final baffle 130 smoothly into the outlet nozzle 36.

As may be seen from FIG. 8, the outlet nozzle 26 is of notched configuration, V-shaped in vertical cross-section, to shape the jet of liquid issuing from it. Nozzles of different configurations at flare angles of, for example, 30°, 45° and 60° may be selected as desired for a particular application involved.

Summarizing, it will be appreciated that an applicator gun according to the present invention offers significant advantages in reducing losses of expensive plastic resins hitherto associated with spray methods involving atomized sprays. Such losses arose from the formation of very small particles of resin which never reached the workpiece. This problem is avoided by mixing the resin and catalyst in an air free mixing chamber within the applicator gun and by directing it through a nozzle to issue as a liquid jet substantially without atomization.

Further, this desirable result is achieved utilizing valving structure which avoids the need for precision ground metal-to-metal seals. Moreover, the operation of the valves during spraying is coordinated during the single squeezing action of the trigger. In addition the selector enables the particular combination of material directed against the workpiece, when the trigger is depressed, to be easily changed.

Although the invention has been described with reference to a preferred embodiment, it will be understood by those skilled in the art that modifications and changes may be made without departing from the spirit and scope of the invention.

I claim:

1. An applicator gun for applying mixed resin, catalyst and reinforcing fibers utilizing separate external sources of air, resin and catalyst under pressure and a supply of fibers, the gun comprising:

a body;

a mixing chamber within said body extending in axial and radial directions, said mixing chamber having axially spaced opposite ends;

an internal nozzle projecting axially into said mixing chamber from one of said ends generally centrally thereof;

catalyst valve means connected to said body for selectively connecting said nozzle with the external supply of catalyst under pressure to direct catalyst into said mixing chamber in an axial stream generally centrally thereof;

resin valve means connected to said body for selectively delivering resin from the external source of resin under pressure;

passage means in said body connecting said resin valve means with said mixing chamber adjacent said one end thereof for directing resin into the mixing chamber in a radially inward direction at a location upstream of the outlet from said internal nozzle whereby the resin forms an enveloping flow about the stream of catalyst issuing from said internal nozzle;

a trigger movable connected to said body for selective motion relatively toward and away from adjacent portions of said body, said trigger during motion relatively toward said body operating said resin and catalyst valve means to deliver resin and catalyst, respectively, into said mixing chamber for mixing therein in the absence of air;

an outlet nozzle connected to said body in communication with said mixing chamber at the opposite end thereof from said one end for directing mixed catalyst and resin outwardly of said mixing chamber as a substantially non-atomized liquid jet;

fiber supply means connected to said body and with the supply of fibers for directing an airborne jet of fibers into said jet of mixed resin and catalyst externally of said outlet nozzle when said fiber-supply means is supplied with air under pressure; and air valve means connected to said body for selectively connecting said fiber supply means with the external supply of air under pressure, said air valve means being operated by said trigger during motion thereof relatively toward said body to supply air under pressure to said fiber supply means to actuate the same.

2. An applicator gun for applying mixed resin, catalyst and reinforcing fibers utilizing separate external sources of air resin and catalyst under pressure and a supply of fibers, the gun comprising:
a body;
a mixing chamber within said body extending in axial and radial directions, said mixing chamber having axially spaced opposite ends;
resin valve means connected with said body for selectively connecting said mixing chamber adjacent one of said ends thereof with the external source of resin under pressure;
catalyst valve means connected with said body for selectively connecting said mixing chamber adjacent said one end thereof with the external supply of catalyst under pressure;
a trigger movably connected with said body for selective motion relatively toward and away from adjacent portions of said body, said trigger during motion relatively toward said body operating said resin and catalyst valve means to deliver resin and catalyst, respectively, into said mixing chamber for mixing therein substantially in the absence of air;
an outlet nozzle connected with said body in communication with said mixing chamber at the opposite end thereof from said one end for directing mixed catalyst and resin outwardly of said mixing chamber as a substantially non-atomized liquid jet;
fiber supply means connected with said body and with the supply of fibers for directing an airborne jet of fibers into said jet of mixed resin and catalyst externally of said outlet nozzle when said fiber supply means is supplied with air under pressure; and
air valve means connected with said body for selectively connecting said fibers supply means with the external supply of air under pressure, said air valve means being operated by said trigger during motion thereof relatively toward said body to supply air under pressure to said fiber supply means to actuate the same.

3. An applicator gun as defined in claim 2, wherein said trigger moves along a predetermined path during motion toward and away from said body, each of said air, resin, and catalyst valve means having separately associated therewith:
a valve actuator projecting into said predetermined path and movable therealong between a extended position in which the associated one of said valve means is closed to prevent flow therethrough and a depressed position in which the associated one of said valve means is open to enable flow therethrough; and
biasing means connected with each said valve actuator for urging the same for the depressed position to the extended position;
said trigger contacting said separate valve actuators associated with said air, resin and catalyst means during motion of said trigger towards said body to move said valve actuators from the extended position to the depressed position thereby causing flow of resin and catalyst under pressure to said mixing chamber and flow of air to said fiber supply means.

4. An applicator gun as defined in claim 3, further including:

means for variably preselecting the ones of said valve actuators to be contacted by said trigger during motion thereof along said predetermined path to thereby enable said air, resin and catalyst valve means to be selectively operated in different combinations to spray each of the following combinations separately:
air and fibers alone;
air and fibers and resin and catalyst; and
resin and catalyst without air.

5. An applicator gun as defined in claim 3, wherein each of said resin and catalyst valve means comprises:
a tubular valve mounted for axial sliding motion in and relative to said body; having,
an axial valve passage therethorough;
an inlet port in said body connected with the associated one of the external sources of resin and catalyst, said inlet port receiving one end of said valve in sliding sealing relation with the external peripheral surfaces thereof, flow being continuously permitted between said inlet port and said valve passage;
an internal chamber in said body surrounding said valve adjacent the opposite end thereof, said internal chamber communicating with said mixing chamber adjacent said one end thereof; and
a valve seat connected with said body within said internal chamber, said valve reciprocable axially between a closed position in which said opposite end of said valve sealingly abuts said valve seat to prevent flow between said valve passage and said internal chamber and an open position in which said opposite end of said valve is spaced away from said valve seat to enable flow between said valve passage and said internal chamber, the associated one of said valve actuators being connected with said valve to reciprocate said valve between said closed and open positions in response to movement of said trigger.

6. An applicator gun as defined in claim 3, further including:
an internal nozzle projecting axially into said mixing chamber from said one end generally centrally thereof, said internal nozzle being connected with said catalyst valve means to direct catalyst into said mixing chamber in an axial stream generally centrally thereof;
passage means in said body connecting said resin valve means with said mixing chamber adjacent said one end thereof for directing resin into the mixing chamber in a radially inward direction at a location upstream of the outlet from said inner nozzle whereby the resin forms an enveloping flow about the stream of catalyst issuing from said internal nozzle; and
a series of perforated, radially extending, axially spaced baffles positioned downstream of said internal nozzle, said baffles causing turbulent agitation of said resin and catalyst to effect thorough mixing thereof before said resin and catalyst reach said outlet nozzle.

7. An applicator gun for applying mixed resin, catalyst and reinforcing fiber utilizing separate external sources of air, resin and catalyst under pressure and a supply of fibers, the gun comprising:
a body, said body including, a handle adapted to be grasped by hand;

a mixing chamber extending in an axial direction and radial directions within said body and having radially extending end surfaces at opposite axial ends of said chamber;

resin valve means connected to said body for selectively connecting said mixing chamber adjacent one of said ends thereof with the external supply of resin under pressure;

catalyst valve means connected to said body for selectively connecting said mixing chamber adjacent said one end thereof with the external supply of catalyst under pressure;

a trigger connected to said body adapted to be grasped by the fingers of a human hand gripping said handle for selective pivoting motion of said trigger relatively toward and away from said handle, said trigger during motion toward said handle operating said resin and catalyst valve means to deliver resin and catalyst, respectively, into said mixing chamber for mixing therein substantially in the absence of air;

an outlet nozzle connected to said body in communication with said mixing chamber at the opposite end thereof for directing mixed resin and catalyst outwardly of said mixing chamber as a substantially non-atomized, liquid jet;

fiber supply means connected to said body and the supply of fibers for directing an airborne jet of fibers strands into said jet of mixed resin and catalyst externally of said outlet nozzle when said fiber supply means is supplied with air under pressure; and air valve means connected to said body for selectively connecting said fiber supply means with the external supply of air under pressure, said air valve means being operated by said trigger during motion thereof towards said handle to supply air under pressure to said fiber supply means to actuate the same.

8. An applicator gun as defined in claim 7, further including:

an internal nozzle projecting axially into said mixing chamber from said one end generally centrally thereof, said internal nozzle being connected with one of said resin and catalyst valve means for directing an axial liquid flow into said mixing chamber generally centrally thereof;

passage means connecting the other of said resin and catalyst valve means with said mixing chamber adjacent said one end for introducing a radially directed liquid flow into said chamber in region upstream of the outlet from said internal nozzle whereby said resin and catalyst are introduced as concentric outer and inner flows, respectively; and a plurality of axially spaced, radially extending perforated baffles connected with said body positioned between said internal nozzle and said outlet nozzle, said baffles causing sufficient turbulence in the flow of resin and catalyst through them to cause thorough mixing of the resin and catalyst prior to passage through said outlet nozzle.

9. An applicator gun as defined in claim 7, wherein said trigger moves along a predetermined path during motion of said trigger toward and away from said handle, each of said air, resin, and catalyst valve means having separately associated therewith;

a valve actuator projecting into said predetermined path and movable therealong between a extended position in which the associated one of said valve means is closed to prevent flow therethrough and a depressed position in which the associated one of said valve means is open to enable flow therethrough; and biasing means connected with each said valve actuator for urging the same from the depressed position to the extended position;

said trigger contacting said separate valve actuators associated with said air, resin and catalyst means during motion of said trigger toward said body to move said valve actuators from the extended position to the depressed position thereby causing resin and catalyst under pressure to said mixing chamber and flow of air to said fiber supply means.

10. An applicator gun as defined in claim 9, wherein:

said valve actuators for said resin and catalyst valve means are contacted by said trigger during motion towards said handle in advance of contact with said valve actuator for said air valve means, whereby resin and catalyst may be sprayed without connection of air to said fiber supply means to actuate the same, the applicator gun further including:

spacing means selectively movable between said trigger and said valve actuator for said air valve means for causing said valve actuator for said air valve means to be depressed by said trigger concurrently with said valve actuators for said resin and catalyst valve means, whereby air may be supplied to said fiber supply means to actuate the same while resin and catalyst are being sprayed.

11. An applicator gun as defined in claim 9, wherein:

said valve actuators for said resin and catalyst valve means are contacted by said trigger during motion towards said handle, whereby resin and catalyst may be sprayed, the applicator gun further including:

spacing means selectively movable between said trigger and said valve actuator for said air valve means for causing said valve actuator for said air valve means to be depressed by said trigger in advance of said valve actuators for said resin and catalyst valve means, whereby air may be supplied to said fiber supply means to actuate the same without spraying resin and catalyst.

12. An applicator gun as defined in claim 9, wherein:

said valve actuators for said resin and catalyst valve means are contacted by said trigger during motion towards said handle in advance of contact with said valve actuator for said air valve means, whereby resin and catalyst may be sprayed without connection of air to said fiber means to actuate the same, the applicator gun further including:

first spacing means selectively movable between said trigger and said valve actuator for said air valve means for causing said valve actuator for said air valve means to be depressed by said trigger concurrently with said valve actuators for said resin and catalyst valve means, whereby air may be supplied to said fiber supply means to actuate the same while resin and catalyst are being sprayed, and second spacing means selectively movable between said trigger and said valve actuator for said air valve means for causing said valve actuator for said air valve means to be depressed by said trigger in advance of said valve actuators for said resin and catalyst valve means, whereby air may be supplied to said fiber supply means to actuate the same without spraying resin and catalyst.

13. An applicator gun as defined in claim 7, wherein each of said resin and catalyst valve means comprises:

a tubular valve mounted for axial sliding motion in and relative to said body said valve having,
an axial valve passage therethrough,
an inlet port in said body connected with the associated one of the external sources of resin and catalyst, said inlet port receiving one end of said valve in sliding sealing relation with the external peripheral surfaces thereof, flow being continuously permitted between said inlet port and said valve passage;
an internal chamber in said body surrounding said valve adjacent the opposite end thereof, said internal chamber communicating with said mixing chamber adjacent said one end thereof; and
a valve seat connected with said body within said internal chamber, said valve reciprocable axially between the extended position in which said opposite end of said valve sealingly abuts said valve seat to prevent flow between said valve passage and said internal chamber and the depressed position in which said opposite end of said valve is spaced away from said valve seat to enable flow between said valve passage and said internal chamber, the associated one of said valve actuators being connected with said valve to reciprocate said valve between said extended and depressed positions in response to movement of said trigger.

14. An applicator gun as defined in claim 7, adapted for additional connection to an external source of cleaning solvent under pressure, such as acetone, the gun further including:

solvent valve means connected with said mixing chamber and with the external supply of solvent under pressure; and an actuator connected with said body selectively operable independently of said trigger to open and close said solvent valve means whereby solvent may be selectively directed through said mixing chamber at the conclusion of operation to flush out mixed resin and catalyst within said mixing chamber and outlet nozzle.

15. A method of applying mixed resin, catalyst and reinforcing fibers utilizing separate external sources of air, resin and catalyst under pressure and a supply of fibers, the method comprising the steps of:

connecting a hand held gun to the external sources of resin and catalyst under pressure,
selectively and concurrently delivering air free resin and air free catalyst under pressure to an axially extending enclosed mixing chamber within the gun, introducing the resin and catalyst into the mixing chamber adjacent one of its ends as concentric outer and inner liquid streams respectively,
directing the resin and catalyst through the mixing chamber towards the other of its ends along a tortuous path in which the resin and catalyst streams are subjected to sufficient turbulence to cause them to become thoroughly mixed in the absence of air,
directing the mixed resin and catalyst out through a nozzle at the outer end of the chamber as a substantially non-atomized liquid jet, and directing an airborne jet of fibers into the liquid jet of resin and catalyst to mix therewith externally of the nozzle.

16. A method as defined in claim 15, further including:

utilizing a trigger on the gun which is squeezed by hand to control the flow of resin and catalyst and the airborne jet; and
selectively varying the combination of flows that occurs whenever the trigger is squeezed to enable spraying of each of the following combinations separately:
resin, catalyst and the airborne jet, or
resin and catalyst alone, or
the airborne jet alone.

* * * * *

PO-1050
(5/69)

UNITED STATES PATENT OFFICE
CERTIFICATE OF CORRECTION

Patent No. 3,801,009            Dated April 2, 1974

Inventor(s) Joseph Marshall, III

It is certified that error appears in the above-identified patent and that said Letters Patent are hereby corrected as shown below:

Col. 14, line 29, "outer" should read --other--.

Signed and sealed this 1st day of October 1974.

(SEAL)
Attest:

McCOY M. GIBSON JR.            C. MARSHALL DANN
Attesting Officer            Commissioner of Patents